United States Patent [19]

McCoy et al.

[11] Patent Number: 4,646,630
[45] Date of Patent: Mar. 3, 1987

[54] HUMIDIFIER ASSEMBLY

[75] Inventors: James M. McCoy, Everett; Beverly J. Allen, Seattle, both of Wash.

[73] Assignee: The Lucks Company, Seattle, Wash.

[21] Appl. No.: 715,529

[22] Filed: Mar. 25, 1985

[51] Int. Cl.[4] .................. H05B 1/00; A21C 13/00
[52] U.S. Cl. .................................. 99/468; 99/474; 99/483; 126/348; 126/369; 219/362; 219/401
[58] Field of Search .............. 99/467, 468, 473–475, 99/483; 219/401, 333, 362, 273; 126/369, 348, 20; 34/151; 261/DIG 46, 26–29

[56] References Cited

U.S. PATENT DOCUMENTS

| | | |
|---|---|---|
| 2,499,525 | 3/1950 | Person . |
| 2,888,006 | 5/1959 | Martin . |
| 3,087,485 | 4/1963 | Powers . |
| 3,290,124 | 9/1965 | Morrissey . |
| 3,332,672 | 7/1967 | Schipper . |
| 3,456,598 | 7/1969 | MacKay . |
| 3,518,949 | 7/1970 | Stock . |
| 3,604,895 | 9/1971 | MacKay . |
| 4,010,349 | 3/1977 | Lee . |
| 4,089,915 | 5/1978 | Jackson . |
| 4,289,713 | 9/1981 | Goettl . |
| 4,333,887 | 6/1982 | Goettl . |
| 4,361,522 | 11/1982 | Goettl . |
| 4,373,430 | 2/1983 | Allen . |

OTHER PUBLICATIONS

Baker's Aid Proof Box, model BAP-2-RI, Baker's Aid Inc., 1765 Carter Avenue, Bronx, New York 10457.

Primary Examiner—Timothy F. Simone
Attorney, Agent, or Firm—Seed and Berry

[57] ABSTRACT

A humidifier assembly for bakery proof boxes for inservice removal of water and water-borne impurities has a water receptacle with a nonstick coating which includes an interior bottom with a raised section and a contiguous lowered sump. Surrounding sidewalls contain water which is heated. Water from a water supply passes through a solenoid valve and into a nozzle injecting water against the raised floor. The water contacts a near sidewall, creating turbulence and a scrubbing action and spreads over the entire raised floor.

Heating elements are provided to heat the raised bottom section of the receptacle without heating the sump and water in the sump. Such elements are cast in the bottom section of the receptacle.

Water and impurities are removed from the sump through an outlet conduit which is connected to a venturi. The venturi is connected to a drain line and to the water supply through a flush solenoid valve. A siphon breaker is provided.

A pressure switch which is connected to a bell submerged in the sump activates the fill solenoid valve.

Under the control of a timer, or manually, as desired, the flush solenoid valve is periodically actuated to create a suction in the venturi and remove water and water-borne particles. Water flows also through a check valve and into the nozzle to wash particles from the wall of the receptacle and the raised floor.

14 Claims, 4 Drawing Figures

HUMIDIFIER ASSEMBLY

TECHNICAL FIELD

The invention relates to a humidifier assembly particularly suited for use in proof boxes of the type used in the bakery industry.

BACKGROUND ART

Proof boxes are cabinets which provide an environment with a controlled temperature and humidity for the raising of dough. Water is boiled to provide the humid atmosphere which keeps the exterior surface of the dough pliable and prevent formation of a crust on the product.

Problems arise because the water utilized in maintaining the humid environment usually contains calcium and magnesium ions and other impurities. The impurities create several problems, the greatest of which is the precipitation of these ions as carbonate: scale. The impurities can be carried to the product with the generated steam. The impurities also tend to collect on the blower used to circulate the humid air in the proof boxes, the cabinet walls and the environmental controls, causing them to corrode and malfunction. Further, because a large percentage of the impurities tend to remain in the steam generation device as water is boiled off, a high level of impurities develops in the heated water quickly.

Some of the adverse consequences can be reduced by periodic cleaning of the humidity generation equipment in the proofing cabinets. The cleaning of the humidity generation equipment would normally be done after the cabinet is no longer being used for proofing. These cleaning tasks are tedious and there is a natural reluctance by the bakers to perform these tasks, especially since they must occur outside of the baking day because cleaning interferes with the use of the cabinet.

Due to increasingly poor water conditions in this country, the level of impurities found in the water used in proofing cabinets is increasing. This increase further emphasizes the need for a humidifier system which will minimize or avoid the adverse effects of the presence of the impurities.

DISCLOSURE OF INVENTION

A humidifier assembly particularly suited for use in bakery proof boxes includes features which provide for in-service removal of water and water-borne impurities. The humidifier has a water receptacle which includes an interior bottom with a raised section and a contiguous lowered section which forms a sump. The water receptacle is provided with surrounding sidewalls to contain water which is heated to create the steam needed in the proofing process. The interior corners of the receptacle are rounded to provide smooth surfaces which avoid scale buildup. Water is introduced to the receptacle through a nozzle. Water from a water supply passes through a solenoid valve and into the nozzle. Water pressure and an opening on the end of the nozzle cause the water to be injected against the raised floor of the receptacle near the sidewall at the opposite end from the sump. The water impinging on the floor of the receptacle spreads out and contacts the near sidewall, creating turbulence and a scrubbing action. It also spreads out to provide a sheet of water extending over the entire raised floor surface.

Water heating elements are provided to heat the raised bottom section of the receptacle to create steam without heating the walls of the sump and water in the sump.

Water and water-borne impurities are removed from the sump through an outlet conduit which is connected to a suction device. The suction is provided by a venturi which is connected to a drain line and to the water supply through a flush solenoid valve. Also, a siphon breaker is provided in the drain line.

The interior of the receptacle is coated with a non-stick coating to reduce adhesion of scale.

The system controls include a pressure switch which is connected to a bell submerged in the unheated sump to detect the water level. The pressure switch activates the fill solenoid valve. The hysteresis of the pressure switch in the sump is used to maintain a shallow level of water over the raised floor surface of the receptacle during the steam generation cycle.

Under the control of a timer, the flush solenoid valve is actuated to create a suction in the venturi and remove water from the sump area, including water-borne particles. At the same time, water flows through a check valve into the water introduction nozzle to wash particles from the wall of the receptacle and the raised floor area and into the sump. At the end of the brief flushing operation, the flush valve is turned off and the water level is reestablished under the control of the pressure switch.

BEST MODE FOR CARRYING OUT THE INVENTION

The invention relates to a humidifier assembly of the type particularly suited for use in proof boxes. Proof boxes are used by bakers to provide an environment in which the humidity and temperature of the proofing cabinet are controlled, and are used in connection with the raising of dough.

Figure 1:
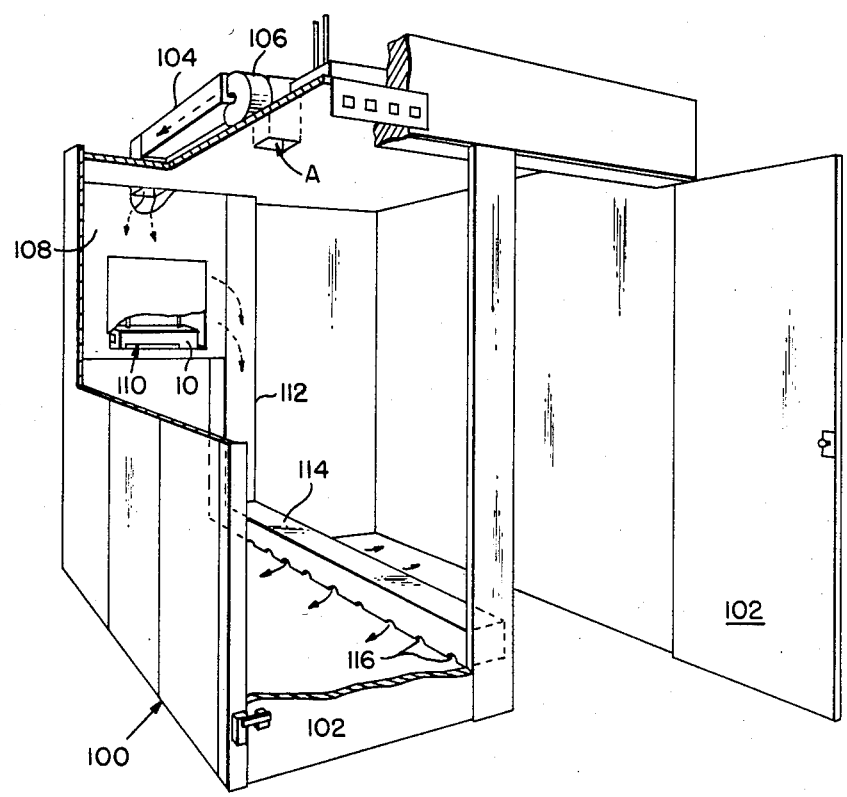
FIG. 1 is a perspective view of a two-door proofing cabinet illustrating the environment in which the humidifier assembly is utilized. The position of the humidifier assembly in the humidifier plenum on the upper left-hand rear wall of the proofing cabinet is shown.
Figure 2:
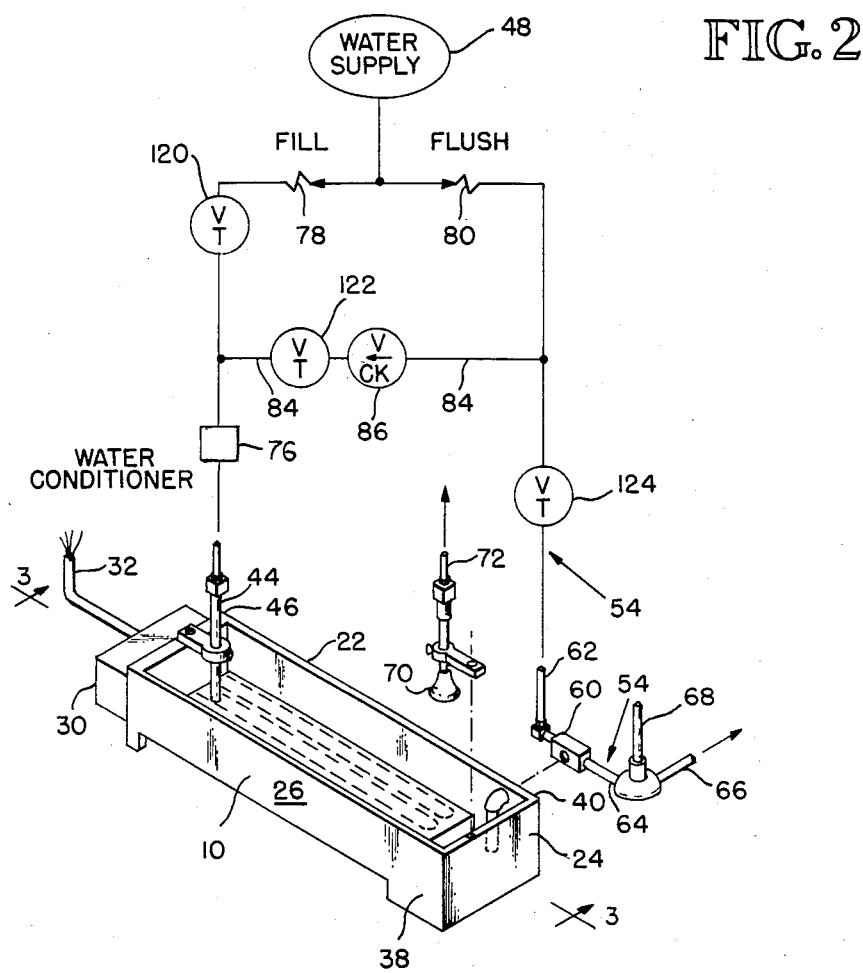
FIG. 2 is a partially exploded, perspective view of the humidifier assembly, with the piping and controls shown in schematic form.
Figure 3:
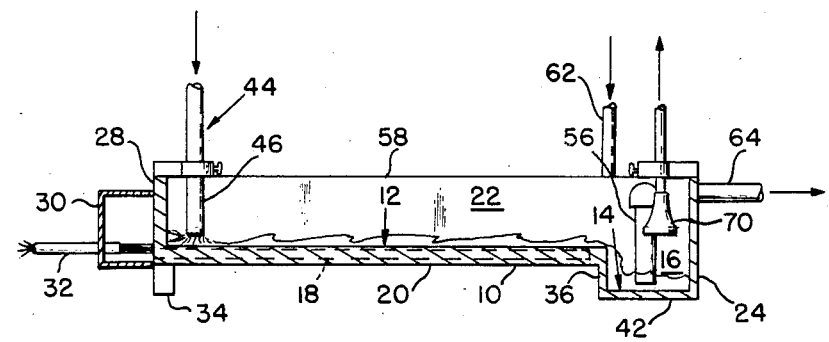
FIG. 3 is a side elevation view, in section, taken along the line 3—3 from FIG. 2.
Figure 4:
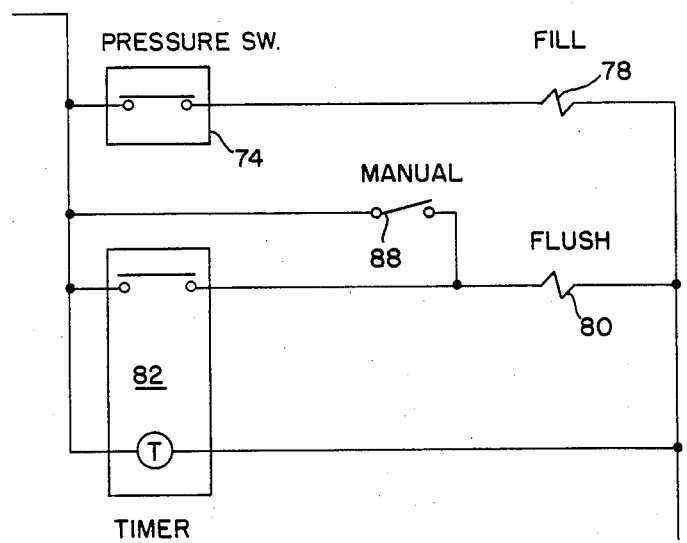
FIG. 4 is a schematic diagram of the electrical controls for the humidifier.

A proof box of the type with which the humidifier assembly may be used is shown in FIG. 1. The proof box cabinet 100 is insulated and has access doors 102. Carts carrying the dough to be proofed are rolled into the cabinet. Air from the interior of the cabinet is drawn into a heating chamber 104 by blower 106, as shown by arrow A. The air is preheated then discharged into a humidifier plenum 108. The plenum forms a chamber which houses the humidifier assembly 110. In this plenum, moisture in the form of steam is added to the heated air stream. The heated, moist air is then introduced into the vertical duct 112. The air is then directed downwardly into a floor duct 114. The air is then discharged into the interior of the proof box through a plurality of holes 116 along either side of the floor duct. The operation of the proof box illustrated is explained more fully in the assignee's issued U.S. Pat. No. 4,373,430. The proof box illustrated is only an example of one type of proof box with which the humidifier assembly 110 may be used. Other types and styles of proof boxes may utilize the humidifier assembly described below.

The humidifier assembly 110 includes a receptacle such as pan 10 in which the water which is to be heated to form steam is held. In its preferred form, the pan has a bottom which includes a raised floor 12 and a lowered floor 14. The lowered floor forms the bottom of an integral sump 16, preferably at one end of the receptacle. The receptacle is preferably rectangular in shape, with the raised floor 12 forming an elongated floor surface. The interior corners of the receptacle are preferably rounded to form a smooth interior. This elongated surface is heated. Preferably, it is heated by the use of embedded electrical heating elements 18 which are cast into the raised bottom structure 20 of the receptacle. Preferably, the receptacle is formed entirely of cast aluminum. Alternatively, the bottom alone may be cast and the surrounding sidewalls 22, 24, 26 and 28 welded. The receptacle may also be formed of drawn metal such as stainless steel. If the drawn metal version is utilized, the preferred form of heater is of the type known as a silicon heater. The silicon heater comes in the form of a flexible pad which may be adhesively secured to the underside of the raised floor 12. Either design inherently prevents element burnout since they will withstand the overheating which results when there is no water in the tank.

A protective electrical cover 30 is provided and extends over the location where the incoming electrical power wires 32 connect to the heater elements.

The receptacle is also provided with adjustable support legs 34 beneath bottom structure 20 opposite the sump to provide a firm base for the receptacle. The adjustability is provided to maintain a slight slope toward the sump.

The walls 24, 36, 38 and 40 and floor section 42 which form the sump are unheated. Impurities tend to collect at a higher rate on heated surface areas. Because the surfaces of the sump are unheated and, during operation, a greater quantity of water is located in the sump than is located over the heated, raised floor section, there is less of a buildup of impurities on surfaces in the sump area. The sump also serves as a collection area for suspended impurities and pieces of scale that have broken free from other surfaces.

To further impede the buildup of impurities, the interior surfaces of the receptacle are preferably coated with a polytetrafluorethylene coating. A coating such as the Dupont Silverstone Teflon brand product is preferred. The addition of the PTFE coating results in only limited scrubbing being required to clean the interior surface of the receptacle completely. The coating also protects the metal receptacle from corrosion, particularly where aluminum is used in the area having water with a high degree of salinity. Other coatings or surface finishes may be provided, such as nickel-phosphorous plating, to provide a smooth surface which resists deposition.

A provision is made for the introduction of water to the receptacle. Preferably, this takes the form of the water fill and flush line connected to nozzle 44. The water fill and flush line has a vertical section 46 which is connected to a water supply 48. The nozzle is provided with a discharge opening. The discharge opening is positioned and sized so that water is injected against the floor 12 and spreads out against the adjacent wall of the receptacle so that turbulence and a scrubbing action are created. When water is introduced into the fill line and the receptacle, it also spreads out and generates a sheet of water over substantially the entire width and the full length of the raised floor 12.

In order to remove water and impurities from the receptacle, a flush assembly 54 is provided. The flush assembly includes a water and impurity removal provision which, preferably, includes an outlet in the form of suction conduit 56 which extends down into the sump so that its inlet is positioned near the floor of the sump. The suction conduit 56, preferably, extends through the sidewall 22 of the receptacle at a point below its rim 58. The suction conduit 56 then connects to a suction device, preferably a venturi 60. The suction conduit 56 connects to the venturi at its low-pressure connection. The inlet connection 62 of the venturi is connected to water supply 48. The outlet connection 64 of the venturi is connected to a drain line 66. A siphon breaker, such as vent 68, is provided in the drain line 66. The outlet conduit, the venturi and the drain line are all positioned below the level of the rim of the receptacle. This provides the humidifier with passive, water overflow protection. If the water level reaches too high a level, it overflows through the outlet conduit and venturi to the drain. This type of water and impurity removal system avoids the need for a drain control valve which would normally be required on a gravity drain system. The design of the venturi with overflow protection avoids the need for a high-water sensor, which is normally required.

A level sensor is provided within the receptacle. The level sensor preferably takes the form of a pneumatic sensor. In its preferred form, the pneumatic sensor has a downward projecting bell 70 connected by an air tube 72 to a pressure switch 74. The bell preferably has a wide opening to prevent accumulated deposits from bridging its opening and interfering with level detection function. The size of the bell and the size of air tube 72 are selected so as to minimize the volume of air in the air tube compared to the bell. The bell preferably has a short, lower cylindrical section approximately one-eighth to one-quarter inch in height and which is 2½ inches in diameter. The remaining upper portion of the bell has an inwardly curved, conical shape. The internal diameter of the air tube is preferably approximately one-eight of an inch. The lower edge of the bell is positioned above the level of the top of the raised floor surface, and a very sensitive pressure switch is used to provide a narrow control range. The pressure switch activation point may be adjusted to cause water to be added when the water falls to a particular level with respect to the bottom of the bell. This add-water point corresponds to a particular low pressure level sensed by the pressure switch. The flow of water is stopped when it reaches a higher level corresponding to a higher pressure level detected by the pressure switch. Problems can arise if the pressure switch activation points are set up under something other than normal operating conditions; for example being set up when the air in the bell and tube is cold. If the pressure switch control points are set up when the air is cold, the add-water point will lower with respect to the bell during operation because of the increased pressure inside the bell caused by the heating of the air trapped in the bell and air tube. The shape of the bell and the size of the air tube are chosen so as to minimize this effect. If the bottom of the bell were positioned below the level of the raised, heated floor surface 12 the add-water level under hot air conditions could fall below the level of the raised floor 12. If this occurs, since the sump in unheated, steam generation would stop and no water would be added to restart steam generation. For this reason the bottom of the bell is positioned above the heated floor surface. The bell is located in the cooler sump area to minimize the accumulation of impurities on its surface. This type of water level control eliminates moving parts from the humidifier tank area.

The plumbing and control connections to the humidifier may include a water conditioner 76 of the magnetic type, which affects the crystalline structure of the scale, converting it to a flushable sludge, and which is connected between the water supply and the inlet water nozzle 46. The water supply to the nozzle is controlled, such as through the use of solenoid valve 78. The operation of this solenoid valve is controlled, such as through connection to pressure switch 74. In operation, the water supply is turned on and off under the control of pressure switch 74 to maintain a shallow level of water over the heated, raised floor section 12 of the receptacle. When the water level is reduced through evaporation, the pressure switch turns the fill valve on to raise the water level to a predetermined level. This water level preferably ranges from one-eighth to one-fourth inch.

In order to remove impurities which have collected in the sump, to remove water which has developed a relatively high level of residual impurities, and to flush the surfaces of the receptacle, water is periodically swept over the raised floor section and adjacent walls, then is removed such as by suction from the receptacle.

In order to perform the water removal operation, water from the water supply is introduced into the venturi such as by the actuation of the flush solenoid valve 80, preferably operated under influence of a periodic control, such as the timer 82. The water flowing through the venturi 66 and into the drain line 66 causes the water and waterborne impurities to be removed from the sump 16. This suction action greatly improves the withdrawal of solids over that which would occur if a simple gravity drain were used. Utilizing normal tap water pressure of approximately 50 psi, the humidifier tank, including the sump, can be evacuated in five seconds, even considering the simultaneous introduction of flush water. The use of a venturi to create the suction avoids the need for more complicated apparatus, such as pumps and the like, which require more maintenance and a power supply. A manual switch 88 is provided to permit flushing of the humidifier whenever desired.

In order to further enhance the flushing action, water feed line 84 is connected between the downstream side of flush valve 80 and nozzle 46. A check valve 86 is provided in the line so that water from the fill line does not flow through the crossover line while the fill solenoid valve alone is open. Water is ejected from the nozzle and sweeps in a sheet across the raised floor section 12 of the receptacle where the impurites tend to collect. Sweeping action and water turbulence, which are enhanced when the water level is drawn below the edge of the sump, tend to scrub the surfaces and remove the impurities which adhere to the walls and the bottom of the receptacle. The impurities are washed into the sump from where they are picked up and discharged into the drain. The flushing operation is preferably scheduled at intervals of two hours or less. The timer is adjustable, however, to allow for even more frequent flushing, if water conditions warrant. The flushing operation lasts at least long enough the completely change the water in the receptacle and preferably even longer to allow the sweeping action of the water over the heated section of the receptacle floor to break loose impurities clinging to its surface and the adjacent walls. Upon completion of the timed flushing operation, water is allowed to flow back into the container under the control of the level sensor and fill control solenoid valve. With the water maintained at a shallow level over the heated portion of the receptacle floor, the recovry time, i.e., the time between initiation of the flush until the tank is up to a full boil, can be as low as a minute or less.

In order to optimize the operation of the humidifier assembly, throttle valves 120, 122 and 124 are provided in the fill line, cross-connect line 84, and the venturi inlet line 62, respectively. When the humidifer assembly is first installed, throttle valve 124 is adjusted to provide enough water flow through the venturi to create adequate suction. Then the fill throttle valve 120 is adjusted to avoid wave action, which would cause cycling of pressure switch 74 during normal operations. The fill rate must also be adjusted to a slow enough rate to preserve the passive overflow protection. Then, the cross-connect valve 122 is adjusted to get as active flushing as possible, but not faster than the incoming water can be removed by the drain suction.

The humidifier system discussed above provides many advantages over previous systems. It has a considerably enhanced capability for removal of impurities through the use of the flushing action and turbulence of injected water as well as by the use of suction to remove water, water-borne impurities and collected solids. There is a reduced level of collection of impurities and related problems through the use of automatic, periodic flushing; through the use of the unheated sump area for collection of impurities, location of controls, and withdrawal of water and solids; as well as through the use of an adhesion-resistant coating on the interior of the receptacle, as well as the smooth interior design of the humidifier tank. The frequent flushing cuts down on the corrosive atmosphere in the proof box, thus preserving the components. Water overflows are prevented by the structure of the water and impurities withdrawal components. The humidifer assembly also allows in-process flushing with quick steam generation recovery so that the impurities buildup may be dealt with during normal operation. The humidifier assembly also has no moving parts positioned in the water heating area and no components which are significantly affected by the impurities to reduce maintenance and provide trouble-free operation.

While this invention has been described in conjunction with a specific embodiment of the humidifier assembly and an application of the humidifer assembly, it should be understood that these are merely illustrative. Numerous modifications and alterations may be made to the humidifier system and in its use without departing from the spirit and scope of the invention, and it is intended that the patent shall cover whatever features of patentable novelty exist in the invention and are encompassed within the following claims.

We claim:

1. A humidifier assembly, particularly suited for use in a proof box, comprising:

(a) a water receptacle having an interior bottom and surrounding sidewalls, with the interior bottom having a raised section and means for collecting waterborne impurities, said impurity collecting means including a contiguous lowered section forming a sump for collecting the impurities;
(b) means for introducing water to the receptacle;
(c) means for heating water in the receptacle over the raised bottom section to create steam; and
(d) means for removing water and waterborne impurities from the sump.

2. A humidifier assembly, particularly suited for use in a proof box, as claimed in claim 1, wherein the removal means includes an outlet conduit having an inlet in close proximity to the bottom of the sump to allow removal of particulate matter from the sump and means connected to the outlet conduit for applying suction to the outlet conduit to cause removal of water and impurities from the sump.

3. A humidifier assembly, particularly suited for use in a proof box, as claimed in claim 2, wherein the suction means comprises a venturi having a low-pressure connection connected to the outlet conduit, an inlet connected to a fluid supply, and an outlet connected to a drain.

4. A humidifier assembly, particularly suited for use in a proof box, as claimed in claim 3, wherein the outlet conduit extends upward from its inlet which is in close proximity to the bottom of the sump, and wherein the outlet conduit then passes through the sidewall of the receptacle below the top of the receptacle top and is connected to the venturi and drain below the level of the top of the receptacle so that the water in the receptacle will overflow into the drain rather than flow over the top of the receptacle if too much water is permitted to enter the receptacle.

5. A humidifer assembly, particularly suited for use in a proof box, as claimed in claim 1, wherein the receptacle comprises a rectangular container having the sump at one end and, wherein the raised bottom section is elongated and extends from the edge of the sump on one end to the opposite side of the receptacle at the other end.

6. A humidifier assembly, particularly suited for use in a proof box, as claimed in claim 3, wherein the water introduction means comprises a nozzle which includes means for introducing water into the receptacle on the raised section of the interior bottom to create turbulence and a scubbing action and in a sheet along substantially the full width of the raised bottom section to wash impurities which build up on the surface of the raised section into the sump.

7. A humidifier assembly, particularly suited for use in a proof box, as claimed in claim 6, wherein the water introduction means includes means for injecting the water against the bottom of the raised interior of the receptacle and against a wall of the receptacle opposite the sump to create turbulence and a scrubbing action to scour impurities from the surface of the raised section into the sump.

8. A humidifier assembly, particularly suited for use in a proof box, as claimed in claim 1, wherein the sump is integral with the receptacle, adjacent to the raised bottom section and unheated to avoid the deposition of impurities on the surfaces forming the sump.

9. A humidifier assembly, particularly suited for use in a proof box, as claimed in claim 1, which further comprises means for controlling the introduction of water to the receptacle through the water introduction means, including an air pressure switch, a level detection bell having a lower edge positioned at an elevation above the level of the raised section of the receptacle's interior bottom, and a conduit connecting the bell to the pressure switch.

10. A humidifier assembly, particularly suited for use in a proof box, as claimed in claim 9, wherein the bell has a lower cylindrical wall section and an upper section having an inwardly curved, conical shape.

11. A humidifier assembly, particularly suited for use in a proof box, comprising:
(a) a water receptable having an interior bottom and surrounding sidewalls, with the interior bottom having an elongated raised section extending from a sidewall section and having a contiguous lowererd section forming a sump adjacent an opposite sidewall section;
(b) means for introducing water into the receptacle, including a nozzle which includes means for introducing water into the receptacle on the raised bottom section to create turbulence and a scrubbing action and in a sheet along substantially the full width of the raised bottom section to wash impurities which build up on the surface of the raised section into the sump;
(c) means for heating water in the receptacle over the raised bottom section to create steam without similarly heating the walls of the sump and the water in the sump;
(d) means for removing water and water-borne impurities from the sump, including an outlet conduit having an inlet in close proximity to the bottom of the sump and means connected to the outlet conduit for applying suction to cause removal of water and water-borne impurities from the sump;
(e) means for controlling the introduction of water to the receptacle, through the water introduction means, to control the level of water in the receptacle during steam generation operating periods to maintain a shallow level of water over the raised, heated bottom section; and
(f) means for periodically activating the suction means to withdraw impurities which have collected in the sump and become concentrated in the water because of the evaporation of water from the receptacle and for causing the introduction of water through the water nozzle to wash impurities which have built up into the sump for removal.

12. A humidifier assembly, particularly suited for use in a proof box, as claimed in claim 11, wherein the water introduction means includes an nozzle positioned so that the water is injected against the floor and against the wall of the receptacle opposite the sump to create turbulence and a scrubbing action to scour impurities from the surface of the raised section into the sump.

13. A humidifier assembly, particularly suited for use in a proof box, as claimed in claim 11, wherein the suction means comprises a venturi having a low-pressure connection connected to the outlet conduit, an inlet connectable to a water supply, and an outlet connected to a drain.

14. A humidifier assembly, particularly suited for use in a proof box, as claimed in claim 13, wherein the outlet conduit extends upward from its inlet in proximity to the bottom of the sump and then passes through the sidewall of the receptacle below its top and is connected to the venturi and drain below the level of the top of the receptacle so that the water in the receptacle will overflow into the drain rather than flow over the top of the receptacle if too much water is permitted to enter the receptacle.

* * * * *